US010392944B2

(12) United States Patent
Tallman et al.

(10) Patent No.: US 10,392,944 B2
(45) Date of Patent: Aug. 27, 2019

(54) TURBOMACHINE COMPONENT HAVING IMPINGEMENT HEAT TRANSFER FEATURE, RELATED TURBOMACHINE AND STORAGE MEDIUM

(71) Applicant: General Electric Company, Schenectady, NY (US)

(72) Inventors: James Albert Tallman, Scotia, NY (US); Gary Michael Itzel, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 410 days.

(21) Appl. No.: 15/207,743

(22) Filed: Jul. 12, 2016

(65) Prior Publication Data

US 2018/0016917 A1 Jan. 18, 2018

(51) Int. Cl.
*F02C 7/12* (2006.01)
*F01D 5/18* (2006.01)
(Continued)

(52) U.S. Cl.
CPC ............. *F01D 5/187* (2013.01); *F01D 5/186* (2013.01); *F01D 9/041* (2013.01); *F01D 9/065* (2013.01);
(Continued)

(58) Field of Classification Search
CPC ......... B33Y 10/00; B33Y 80/00; F01D 25/12; F01D 5/186; F01D 5/187; F01D 9/041;
(Continued)

(56) References Cited

U.S. PATENT DOCUMENTS 2,843,354 A 7/1958 Smith
3,575,528 A 4/1971 Beam, Jr. et al.
(Continued)

FOREIGN PATENT DOCUMENTS

DE 4430302 A1 2/1996
DE 19823251 C1 7/1999
(Continued)

OTHER PUBLICATIONS

U.S. Appl. No. 13/461,035, Office Action 2 dated Aug. 19, 2016, 256793-1 (GEEN-0808), 24 pages.
(Continued)

*Primary Examiner* — Jesse S Bogue
(74) *Attorney, Agent, or Firm* — Christopher R. Carroll; The Small Patent Law Group LLC

(57) ABSTRACT

Various aspects include a turbomachine component, along with a turbomachine and related storage medium. In some cases, the turbomachine component includes: a body defining an inner cavity, the body having an outer surface and an inner surface opposing the outer surface, the inner surface facing the inner cavity; and a mount coupled with the inner surface of the body, the mount including: an impingement baffle coupled with and separated from the inner surface of the body, the impingement baffle including a set of apertures configured to permit flow of a heat transfer fluid therethrough to contact the inner surface of the body; and a reclamation channel connected with the impingement baffle for reclaiming the heat transfer fluid.

17 Claims, 6 Drawing Sheets

(51) Int. Cl.

| | |
|---|---|
| ***F01D 9/04*** | (2006.01) |
| ***F01D 25/12*** | (2006.01) |
| ***F02C 3/04*** | (2006.01) |
| ***F01D 9/06*** | (2006.01) |
| *B33Y 10/00* | (2015.01) |
| *B33Y 80/00* | (2015.01) |

(52) U.S. Cl.
CPC ................ *F01D 25/12* (2013.01); *F02C 3/04* (2013.01); *F02C 7/12* (2013.01); *B33Y 10/00* (2014.12); *B33Y 80/00* (2014.12); *F05D 2220/32* (2013.01); *F05D 2230/31* (2013.01); *F05D 2240/11* (2013.01); *F05D 2260/201* (2013.01); *F05D 2260/202* (2013.01); *F05D 2260/204* (2013.01); *F05D 2260/205* (2013.01)

(58) Field of Classification Search
CPC .... F01D 9/065; F02C 3/04; F02C 7/12; F05D 2220/32; F05D 2230/31; F05D 2240/11; F05D 2260/201; F05D 2260/202
See application file for complete search history.

(56) References Cited

U.S. PATENT DOCUMENTS

| | | | | |
|---|---|---|---|---|
| 3,973,874 | A | 8/1976 | Corsmeier et al. | |
| 3,975,901 | A | 8/1976 | Ballinger et al. | |
| 4,023,731 | A | 5/1977 | Patterson | |
| 4,304,093 | A | 12/1981 | Schulze | |
| 4,363,599 | A | 12/1982 | Cline et al. | |
| 4,443,389 | A | 4/1984 | Dodds | |
| 4,487,016 | A | 12/1984 | Schwarz et al. | |
| 4,613,280 | A | 9/1986 | Tate | |
| 4,805,398 | A | 2/1989 | Jourdain et al. | |
| 5,120,192 | A * | 6/1992 | Ohtomo | F01D 5/189 415/115 |
| 5,219,268 | A | 6/1993 | Johnson | |
| 5,259,730 | A | 11/1993 | Damlis et al. | |
| 5,297,386 | A | 3/1994 | Kervistin | |
| 5,363,654 | A | 11/1994 | Lee | |
| 5,591,002 | A | 1/1997 | Cunha et al. | |
| 5,593,278 | A | 1/1997 | Jourdain et al. | |
| 5,704,763 | A | 1/1998 | Lee | |
| 6,116,852 | A | 9/2000 | Pierre et al. | |
| 6,152,685 | A | 11/2000 | Hagi | |
| 6,179,557 | B1 | 1/2001 | Dodd et al. | |
| 6,227,800 | B1 | 5/2001 | Spring et al. | |
| 6,419,146 | B1 | 7/2002 | Buldhaupt et al. | |
| 6,422,807 | B1 | 7/2002 | Leach et al. | |
| 6,428,273 | B1 | 8/2002 | Keith et al. | |
| 6,435,813 | B1 * | 8/2002 | Rieck, Jr. | F01D 5/188 415/115 |
| 6,478,534 | B2 | 11/2002 | Bangert et al. | |
| 6,530,416 | B1 * | 3/2003 | Tiemann | B22C 9/24 164/122.1 |
| 6,533,547 | B2 * | 3/2003 | Anding | F01D 5/188 416/241 R |
| 6,554,563 | B2 * | 4/2003 | Noe | F01D 5/189 415/115 |
| 6,641,363 | B2 | 11/2003 | Barrett et al. | |
| 6,659,714 | B1 | 12/2003 | Tiemann | |
| 6,742,783 | B1 | 6/2004 | Lawer et al. | |
| 6,769,875 | B2 | 8/2004 | Tiemann | |
| 6,779,597 | B2 | 8/2004 | DeMarche et al. | |
| 6,824,351 | B2 | 11/2004 | Endries et al. | |
| 6,877,952 | B2 | 4/2005 | Wilson | |
| 6,925,814 | B2 | 8/2005 | Wilson et al. | |
| 7,028,747 | B2 * | 4/2006 | Widrig | F01D 5/187 164/368 |
| 7,347,671 | B2 | 3/2008 | Dorling et al. | |
| 7,434,402 | B2 | 10/2008 | Paprotna et al. | |
| 7,556,476 | B1 * | 7/2009 | Liang | F01D 5/188 415/115 |
| 7,658,591 | B2 * | 2/2010 | Dervaux | F01D 5/189 415/115 |
| 7,740,444 | B2 * | 6/2010 | Lee | F01D 11/24 415/1 |
| 7,798,775 | B2 | 9/2010 | Kammel et al. | |
| 8,127,553 | B2 | 3/2012 | Ekkad et al. | |
| 8,128,341 | B2 | 3/2012 | Wieghardt | |
| 8,137,055 | B2 | 3/2012 | Lang | |
| 8,403,631 | B2 | 3/2013 | Surace et al. | |
| 8,549,864 | B2 | 10/2013 | Langdon, II et al. | |
| 8,616,827 | B2 | 12/2013 | O'Leary | |
| 8,684,660 | B2 | 4/2014 | Miranda et al. | |
| 9,404,389 | B2 | 8/2016 | Erickson et al. | |
| 9,506,369 | B2 | 11/2016 | Boswell et al. | |
| 9,631,808 | B2 | 4/2017 | Taylor et al. | |
| 9,719,372 | B2 | 8/2017 | Ballard, Jr. et al. | |
| 9,777,636 | B2 | 10/2017 | Morrill | |
| 9,926,801 | B2 | 3/2018 | Uskert et al. | |
| 9,945,250 | B2 | 4/2018 | Kitamura et al. | |
| 10,030,537 | B2 | 7/2018 | Dutta et al. | |
| 2002/0071762 | A1 | 6/2002 | Schroder | |
| 2003/0035722 | A1 | 2/2003 | Barrett et al. | |
| 2010/0247297 | A1 | 9/2010 | Legare et al. | |
| 2011/0027068 | A1 | 2/2011 | Floyd, II et al. | |
| 2011/0135456 | A1 | 6/2011 | Takahashi et al. | |
| 2012/0070302 | A1 | 3/2012 | Lett | |
| 2012/0247121 | A1 | 10/2012 | Kitamura et al. | |
| 2012/0247297 | A1 | 10/2012 | Kawaguchi et al. | |
| 2013/0017060 | A1 | 1/2013 | Boswell et al. | |
| 2015/0110612 | A1 | 4/2015 | Brandl et al. | |
| 2017/0284218 | A1 | 10/2017 | Kondo et al. | |
| 2017/0292389 | A1 | 10/2017 | Lorstad et al. | |
| 2018/0066527 | A1 * | 3/2018 | Kadau | F01D 11/122 |

FOREIGN PATENT DOCUMENTS

| | | | |
|---|---|---|---|
| EP | 1152125 | A1 | 11/2001 |
| EP | 1780376 | A1 | 5/2007 |
| EP | 1806476 | A1 | 7/2007 |
| EP | 2243933 | A1 | 4/2009 |
| EP | 2410128 | A1 | 1/2012 |

OTHER PUBLICATIONS

U.S. Appl. No. 13/461,035, Office Action 3 dated Feb. 14, 2017, 256793-1 (GEEN-0808-US), 19 pages.
U.S. Appl. No. 13/461,035, Notice of Allowance dated Jun. 12, 2017, 256793-1 (GEEN-0808-US), 10 pages.
U.S. Appl. No. 13/461,035, Office Action 1 dated Dec. 17, 2014, 256793-1 (GEEN-0808), 15 pages.
U.S. Appl. No. 13/461,035, Final Office Action 1 dated Apr. 22, 2015, 256793-1 (GEEN-0808), 19 pages.
EP Search Report and Written Opinion dated May 6, 2014 in connection with corresponding EP Patent Application No. 13165921.1.
U.S. Appl. No. 15/164,311, Office Action dated Sep. 7, 2018, 280272-1 (GEEN-0768-US), 31 pages.
U.S. Appl. No. 15/175,597, Office Action dated Oct. 15, 2018, 281364-2 (GEEN-0809-US2), 31 pages.

* cited by examiner

TURBOMACHINE COMPONENT HAVING IMPINGEMENT HEAT TRANSFER FEATURE, RELATED TURBOMACHINE AND STORAGE MEDIUM

BACKGROUND OF THE INVENTION

The subject matter disclosed herein relates to turbomachines. Specifically, the subject matter disclosed herein relates to heat transfer in turbomachines such as gas turbines.

Gas turbomachines (or, turbine systems) generally include a compressor section, a combustor section coupled with the compressor section, and a turbine section coupled with the combustor section. The compressor pressurizes air and that air is mixed with fuel and burned in the combustor section, adding energy to expand air and accelerate airflow into the turbine section. Hot combustion gas that exits the combustor section flows to the turbine section, and transfers kinetic energy to the rotor blades and corresponding shaft to perform mechanical work.

The turbine section of the gas turbine includes alternating rows of turbine (stationary) vanes and turbine (dynamic) blades. The vanes and blades include at least one platform and an airfoil extending from the platform (or between platforms). The turbine section, including its components, is designed to withstand the high temperature and high pressure associated with the combustion gas that flows from the combustor section through the turbine section. However, conventional mechanisms for cooling the vanes and blades are deficient, and can lead to unnecessary maintenance, replacement of parts and/or down time.

BRIEF DESCRIPTION OF THE INVENTION

Various aspects include a turbomachine component, along with a turbomachine and related storage medium. In some cases, the turbomachine component includes: a body defining an inner cavity, the body having an outer surface and an inner surface opposing the outer surface, the inner surface facing the inner cavity; and a mount coupled with the inner surface of the body, the mount including: an impingement baffle coupled with and separated from the inner surface of the body, the impingement baffle including a set of apertures configured to permit flow of a heat transfer fluid therethrough to contact the inner surface of the body; and a reclamation channel connected with the impingement baffle for reclaiming the heat transfer fluid.

A first aspect of the disclosure includes a turbomachine component having: a body defining an inner cavity, the body having an outer surface and an inner surface opposing the outer surface, the inner surface facing the inner cavity; and a mount coupled with the inner surface of the body, the mount including: an impingement baffle coupled with and separated from the inner surface of the body, the impingement baffle including a set of apertures configured to permit flow of a heat transfer fluid therethrough to contact the inner surface of the body; and a reclamation channel connected with the impingement baffle for reclaiming the heat transfer fluid.

A second aspect of the disclosure includes a turbomachine having: a compressor section; a combustor section coupled with the compressor section; and a turbine section coupled with the combustor section, the turbine section including at least one turbomachine component having: a body defining an inner cavity, the body having an outer surface and an inner surface opposing the outer surface, the inner surface facing the inner cavity; and a mount coupled with the inner surface of the body, the mount including: an impingement baffle coupled with and separated from the inner surface of the body, the impingement baffle including a set of apertures configured to permit flow of a heat transfer fluid therethrough to contact the inner surface of the body; and a reclamation channel connected with the impingement baffle for reclaiming the heat transfer fluid.

A third aspect of the disclosure includes a non-transitory computer readable storage medium storing code representative of a turbomachine component, the turbomachine component physically generated upon execution of the code by a computerized additive manufacturing system, the code including: a body defining an inner cavity, the body having an outer surface and an inner surface opposing the outer surface, the inner surface facing the inner cavity; and a mount coupled with the inner surface of the body, the mount including: an impingement baffle coupled with and separated from the inner surface of the body, the impingement baffle including a set of apertures configured to permit flow of a heat transfer fluid therethrough to contact the inner surface of the body; and a reclamation channel connected with the impingement baffle for reclaiming the heat transfer fluid.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
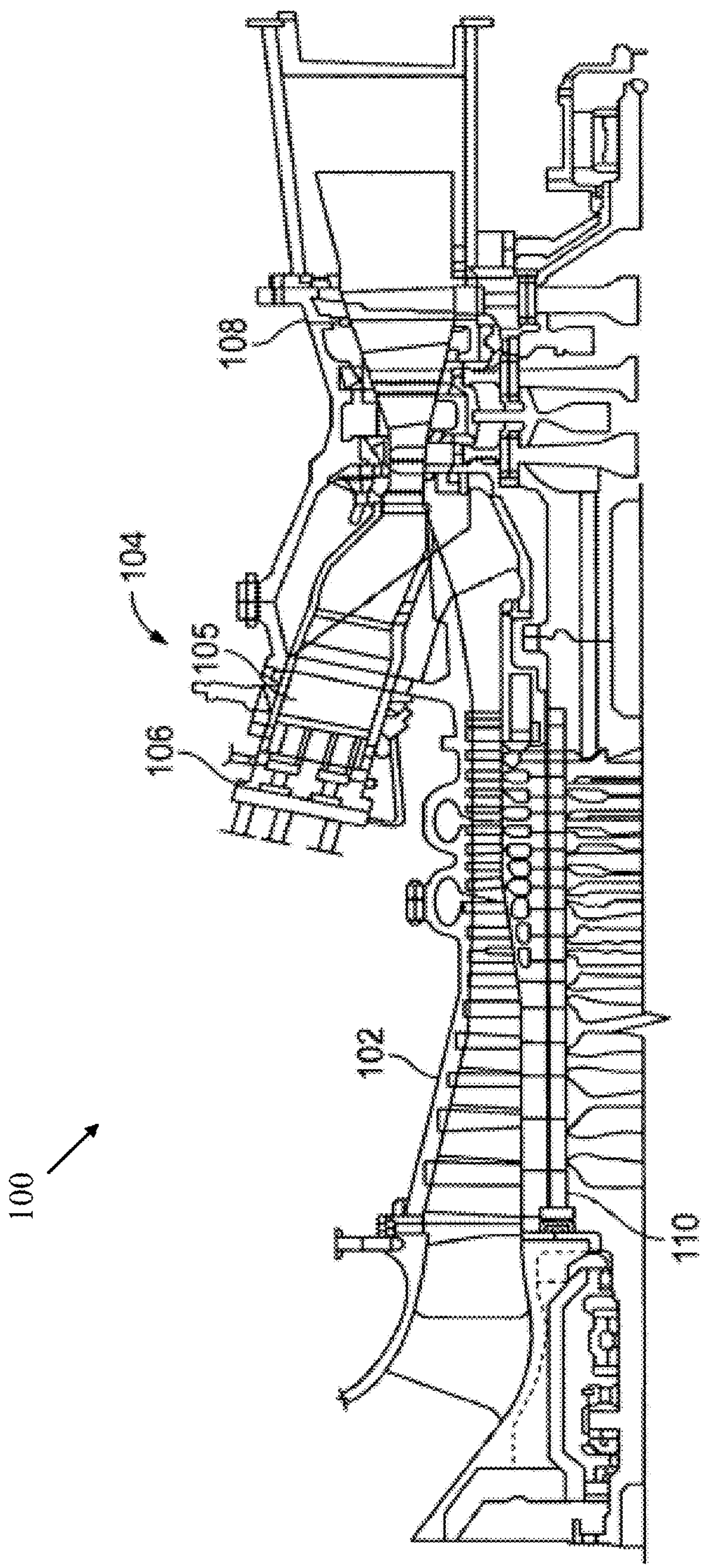
FIG. 1 shows a partial cross-sectional schematic view of a turbomachine system according to various embodiments of the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to turbomachines. Specifically, the subject matter disclosed herein relates to heat transfer in turbomachines such as gas turbines.

According to various embodiments of the disclosure, in contrast to conventional turbomachine parts, the turbomachine components disclosed herein include an internal impingement baffle and corresponding reclamation channel for effective heat transfer (e.g., cooling) of those components. The components disclosed herein can be used in a closed-loop heat transfer (e.g., cooling) configuration whereby a heat transfer fluid is circulated through an internal portion of the component body and reclaimed via the reclamation channel for use in the broader turbomachine system, e.g., upstream of the combustor section.

FIG. 1 shows a partial cross-sectional schematic view of a turbomachine system (or simply, turbomachine) 100 (e.g., a gas turbomachine, or gas turbine) according to various embodiments. Turbomachine system 100 includes a compressor section 102 and a combustor section 104 coupled with the compressor section 102. Combustor section 104 includes a combustion region 105 and a fuel nozzle assembly 106. Turbomachine system 100 also includes a turbine section 108 (e.g., gas turbine section) coupled with combustor section 104 and a common compressor/turbine shaft 110 (sometimes referred to as rotor 110).

In operation, air flows through compressor section 102 and compressed air is supplied to combustor section 104. Specifically, the compressed air is supplied to fuel nozzle assembly 106 that is integral to combustor section 104. Fuel nozzle assembly 106 is in fluid communication with combustion region 105, such that fluid can flow between these regions. Fuel nozzle assembly 106 is also in fluid communication with a fuel source (not shown in FIG. 1) and channels fuel and air to combustion region 105. Combustor section 104 ignites and combusts the fuel. Combustor section 104 is in fluid communication with turbine section 108, for which gas stream thermal energy is converted to mechanical rotational energy. Turbine section 108 can be rotatably coupled to, and drive, rotor 110. Compressor section 102 may also be rotatably coupled to shaft 110. In some embodiments, the turbomachine system 100 includes a plurality of combustors 104 and fuel nozzle assemblies 106. In the following discussion, unless otherwise indicated, only one of each component will be discussed.

Figure 2:
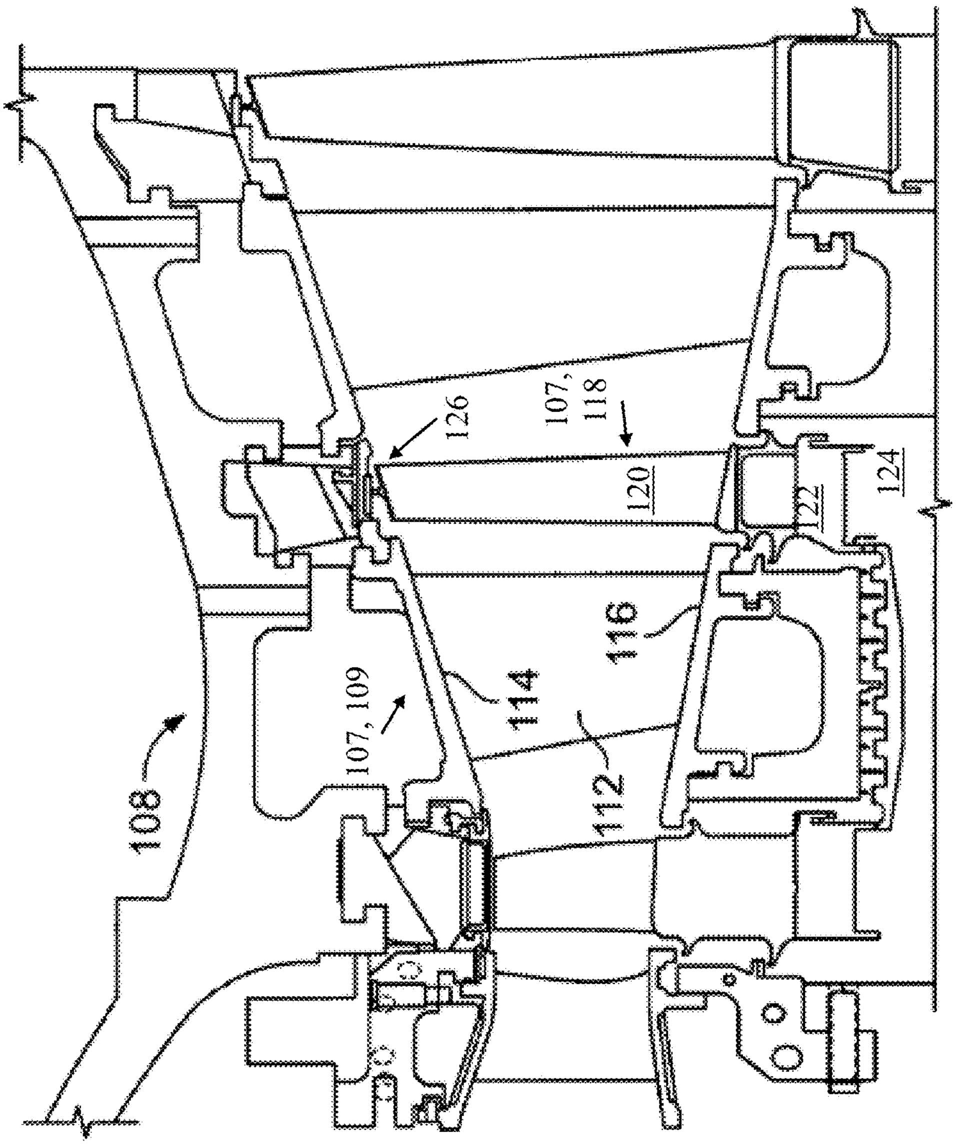
FIG. 2 shows a close-up cross-sectional illustration of a portion of the turbine section of the turbomachine system of FIG. 1 according to various embodiments of the disclosure.

FIG. 2 shows a close-up cross-sectional illustration of a portion of the turbine section 108 of turbomachine system 100 of FIG. 1 according to various embodiments of the disclosure. A three-stage nozzle is shown in FIG. 2 merely for illustrative purposes, and it is understood that systems with any number of nozzle stages may benefit from the various teachings of the disclosure. As shown, turbine section 108 can include a turbomachine component 107, which can include a nozzle 109 in some cases. Nozzle 109 can include an airfoil (also called a vane) 112, a radially outer platform 114 coupled (e.g., welded, brazed, integrally cast, additively manufactured) to/with airfoil 112, and a radially inner platform 116 coupled (e.g., welded, brazed, integrally cast, additively manufactured) to/with airfoil 112. Platforms 112, 114 may help to retain nozzle 109 within turbine section 108. It is understood that according to various embodiments, that turbomachine component 107 can also include a turbomachine bucket 118, such as a dynamic gas turbomachine bucket. The bucket 118 can include a blade 120, a base 122 coupled to the blade 120 and a rotor body 124, and may include a shroud 126 for sealing adjacent stages of buckets 118 and nozzles 109. In some case, the turbomachine component 107 can include a portion of a bucket 118 or nozzle 109, such as a platform 114, 116 base 122, shroud 126, airfoil 112 and/or blade 120. It is understood that according to various embodiments, turbomachine component 107 can include any component within a turbomachine system 100, e.g., a combustor liner, a transition piece, and/or a shroud.

Figure 3:
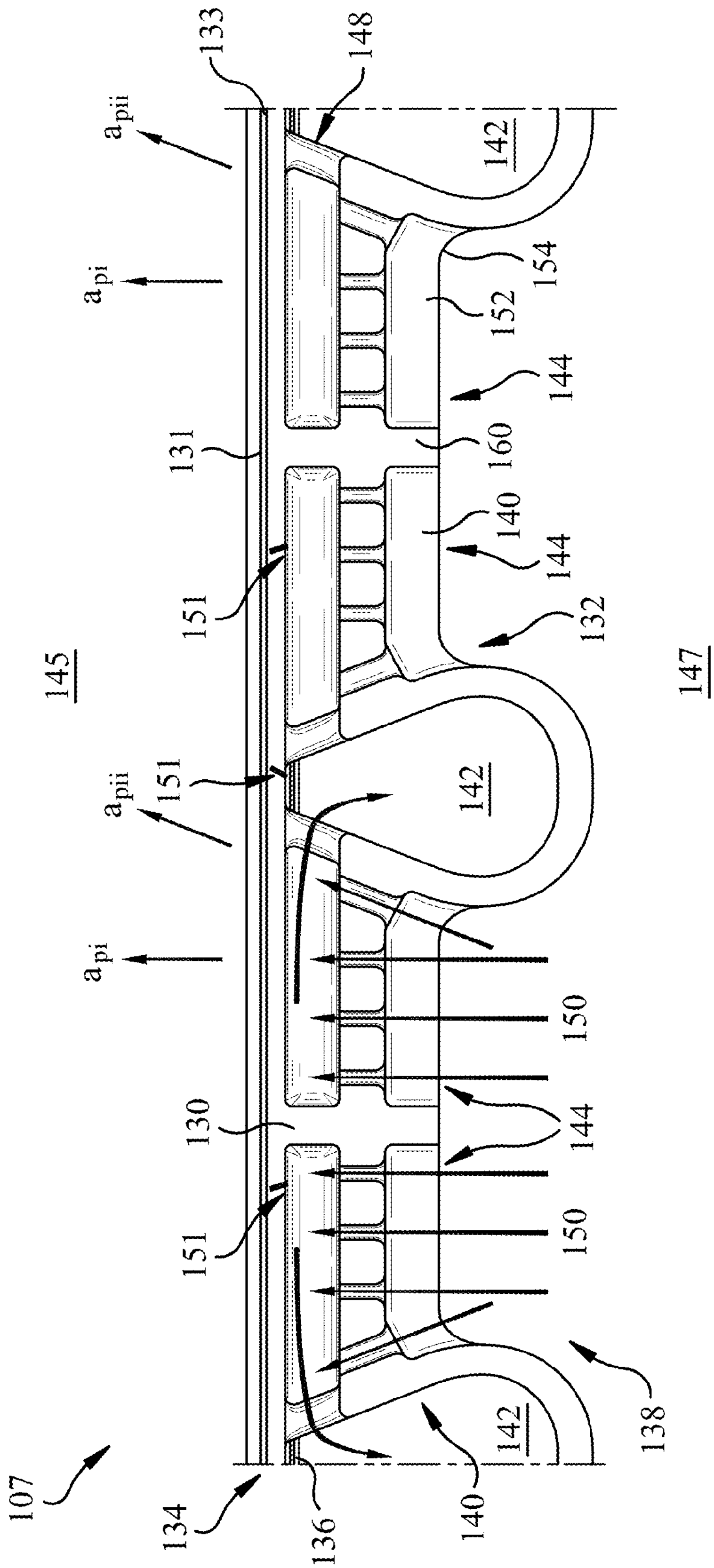
FIG. 3 shows a schematic side view of a portion of a turbomachine component according to various embodiments of the disclosure.
Figure 4:
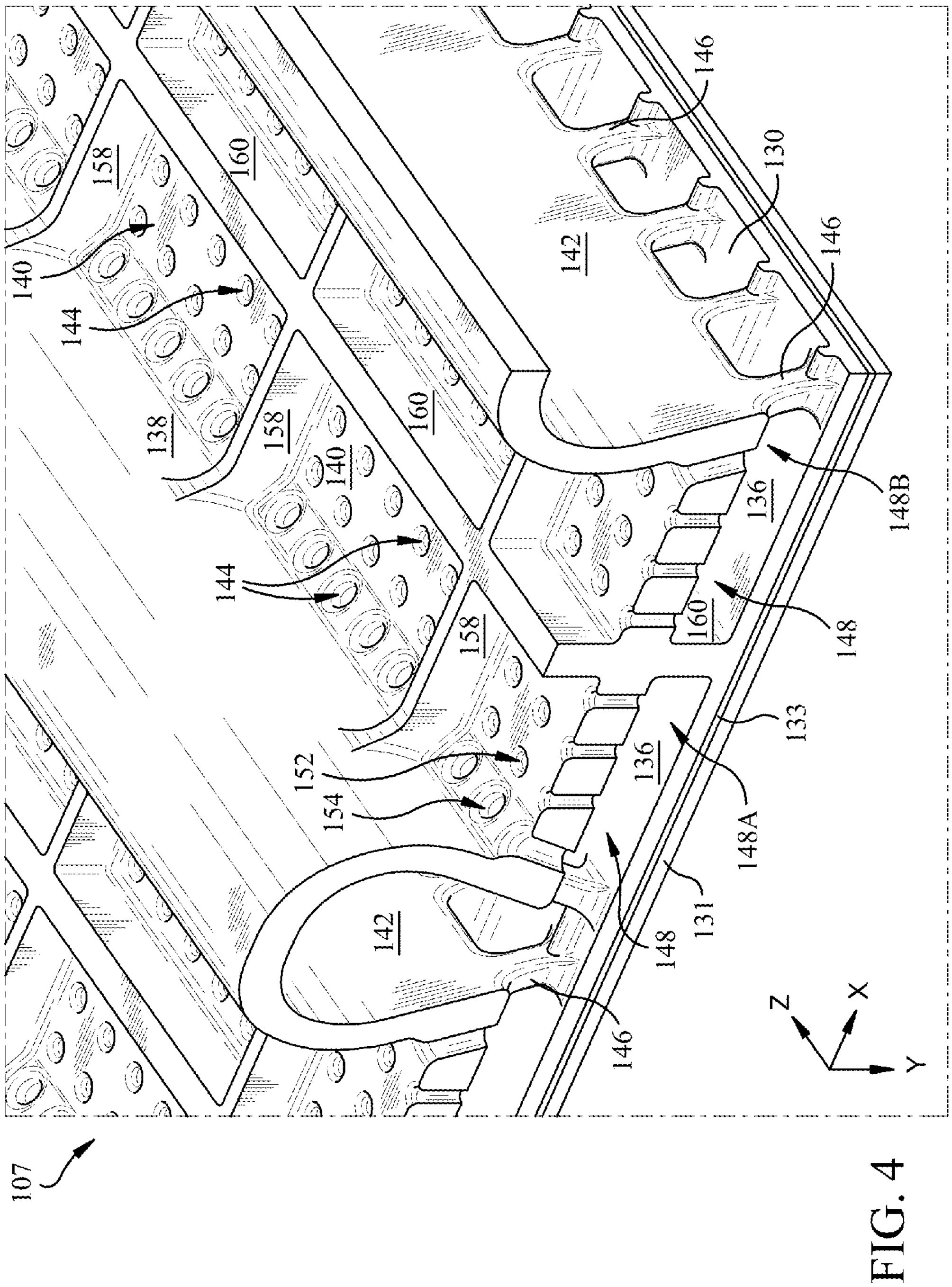
FIG. 4 shows a schematic perspective view of the portion of the turbomachine component of FIG. 3 according to various embodiments of the disclosure.

FIG. 3 shows a schematic side view of a portion of a turbomachine component 107 (e.g., airfoil 112 or blade 120) according to various embodiments. In some cases, where component 107 includes an airfoil 112 or blade 120 the side view of FIG. 3 can be seen from a cut-away perspective from platform 114, 116 or base 122 or shroud 126. FIG. 4 shows a schematic perspective view of the portion of turbomachine component 107, while FIG. 5 illustrates a schematic perspective view another portion of turbomachine component 107 from an inner perspective.

Figure 5:
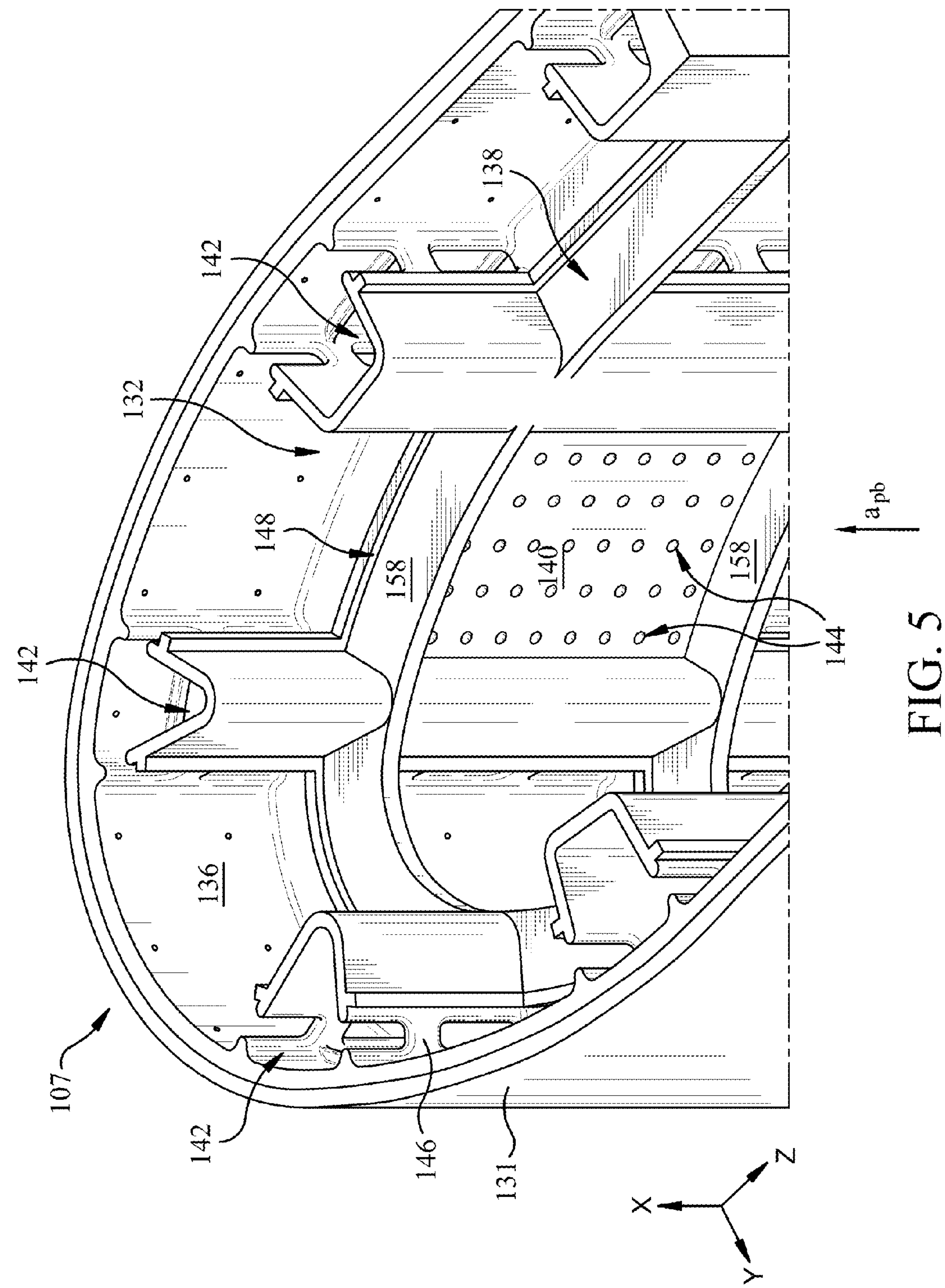
FIG. 5 illustrates a schematic perspective view another portion of the turbomachine component of FIG. 3 and FIG. 4, from an inner perspective.

With reference to FIGS. 3-5, turbomachine component 107 can include a body (e.g., airfoil body or blade body) 130 defining an inner cavity 132 (e.g., within airfoil body or blade body). Body 130 can include an outer surface 134 and an inner surface 136 opposing outer surface 134. In various embodiments, body 130 can define a portion of an airfoil 112 (or blade 120) or a platform 114, 116 (or base 122 or shroud 126). As shown in the cut-away view in FIG. 5, inner cavity 132 can be substantially enveloped by body 130, such that inner cavity 132 is fluidly isolated from outer surface 134. Inner surface 136 can face inner cavity 132. In some embodiments, a thermal barrier coating (TBC) 131 is located along (e.g., coated on) outer surface 134 of body 130, however the TBC 131 is not necessary in all embodiments. In some cases, a bondcoat layer 133 is formed along outer surface 134 of body 130 between the TBC 131 and outer surface 134. TBC 131 can include any conventional TBC material known in the art, and bondcoat layer 133 can include one or more conventional bondcoat layers. For example, TBC 131 can include a multi-layer coating having a substrate (e.g., metal substrate), bond coat layer (e.g., metallic bond coat), a thermally grown oxide (TGO) and a topcoat such as a ceramic topcoat (e.g., yttria-stabilized zirconia, or YSZ). Bondcoat layer 133 can include polymer(s) and/or latex, as is known in the art.

Turbomachine component 107 can further include a mount 138 coupled with inner surface 136, where mount 138 includes an impingement baffle 140 coupled with and separated from inner surface 136 and a reclamation channel 142 connected with impingement baffle 140. Mount 138 can be formed of any suitable material, e.g., a metal such as steel, or a polymer or other hybrid material capable of withstanding temperature and pressure conditions inside turbine section 108. Mount 138 can be integrally formed (e.g., cast, molded, additively manufactured) with other portions of turbine component 107, or can be separately formed (e.g., cast, molded, assembled, additively manufactured) and joined with other portions of turbine component 107 (e.g., inner surface 136) by welding, brazing, bonding, adhesion, etc. In various embodiments, impingement baffle 140 includes a set of apertures 144 configured to permit flow of a heat transfer fluid (e.g., a coolant such as air, water or another liquid or gas) therethrough (e.g., from an inner region toward inner surface 136) to contact inner surface 136 of body 130. Further, reclamation channel 142 can be configured for reclaiming that heat transfer fluid, e.g., in a closed-loop system. That is, according to various embodiments, heat transfer fluid remains within component 107 and does not flow into working fluid area 145 (e.g., a hot gas flow path). That is, turbomachine component 107 can permit flow of heat transfer fluid 150 from a source region 147 internal to body 130 and mount 138, through mount 138 (e.g., via apertures 144), and back to source region 147 (e.g., via reclamation channel 142). In these cases, heat transfer fluid 150 does not mix with working fluid (e.g., hot gas) in working fluid area 145. As described herein, in various embodiments, heat transfer fluid 150 can be recycled after use to a location at or upstream of combustor section 104.

In some embodiments, it is possible that turbomachine component 107 can include one or more film cooling holes 151 extending from heat transfer region 148 and/or reclamation channel 142 through body 130. These film cooling holes 151 may allow for flow (e.g., film discharge) of cooling fluid through body 130, e.g., for cooling proximate outer surface 134.

As shown most clearly in FIGS. 4 and 5, according to various embodiments, turbomachine component can further include a set of connectors 146 extending between inner surface 136 and mount 138. Connectors 146 can include tabs, extensions, bridge members, etc. coupling mount 138 to inner surface 136. In various embodiments, connectors 146 can be integrally formed (e.g., cast, molded, additively manufactured) with other portions of turbine component 107, e.g., mount 138, or can be separately formed (e.g., cast, molded, assembled, additively manufactured) and joined with other portions of turbine component 107 (e.g., inner surface 136 or mount 138) by welding, brazing, bonding, adhesion, etc.

FIG. 4 illustrates that mount 138 and inner surface 136 can define a heat transfer region 148 therebetween, where a heat transfer fluid can flow and transfer heat away from inner surface 136 (and consequently, body 130). In various embodiments, reclamation channel 142 is located adjacent (e.g., directly contacting or nearly contacting) impingement baffle 140, and is fluidly coupled with heat transfer region 148, such that the flow of heat transfer fluid through impingement baffle 140 and into heat transfer region 148 may flow to reclamation channel 142 for recirculation, e.g., in a closed-loop heat transfer system. As shown in FIG. 3, the set of apertures 144 in impingement baffle 140 can be sized to direct heat transfer fluid 150 (shown schematically) toward reclamation channel 142, via the heat transfer region 148. For example, in some cases, at least one aperture in the set of apertures 144 can include a tapered pathway within the baffle 140. In some cases, the set of apertures 144 includes at least two apertures (first aperture 152, second aperture 154) having distinct primary axes (primary axis $a_{pi}$ of first aperture 152 and primary axis $a_{pii}$ of second aperture 154) with respect to one another as measured relative to inner surface 136 (e.g., as measured relative to, or normal to, the plane of inner surface 136). Second aperture 154 with primary axis $a_{pii}$ (angled with respect to normal measured from inner surface 136) can be closer to reclamation channel 142 than first aperture 152 with primary axis $a_{pi}$ (substantially normal with respect to inner surface 136), and second aperture 154 may have angled primary axis to aid in directing flow of heat transfer fluid 150 toward reclamation channel 142 (and creating a negative pressure region between the outlet of first aperture 152 and second aperture 154).

In various embodiments, as illustrated most clearly in FIG. 4, mount 138 may further include a support spine 158 connecting impingement baffle 140 and reclamation channel 142. Support spine 158 may connect multiple impingement baffles 140 together, and may connect adjacent reclamation channels 142 in some cases. Further, mount 138 can include one or more flow walls 160 which may divide heat transfer region 148 into distinct section 148A, 148B, etc., such that heat transfer fluid is directed toward a nearest reclamation channel 142 in mount 138. In various embodiments, as illustrated most clearly in FIG. 5, body 130 has a primary axis $a_{pb}$, where reclamation channel 142 extends a greater length along primary axis $a_{pb}$ than impingement baffle 140.

Turbomachine components 107, 207 (FIGS. 2-5) may be formed in a number of ways. In one embodiment, turbomachine component 107, 207 (FIGS. 2-5) may be formed by casting, forging, welding and/or machining. In one embodiment, however, additive manufacturing is particularly suited for turbomachine component 107, 207 (FIGS. 2-5). As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 6:
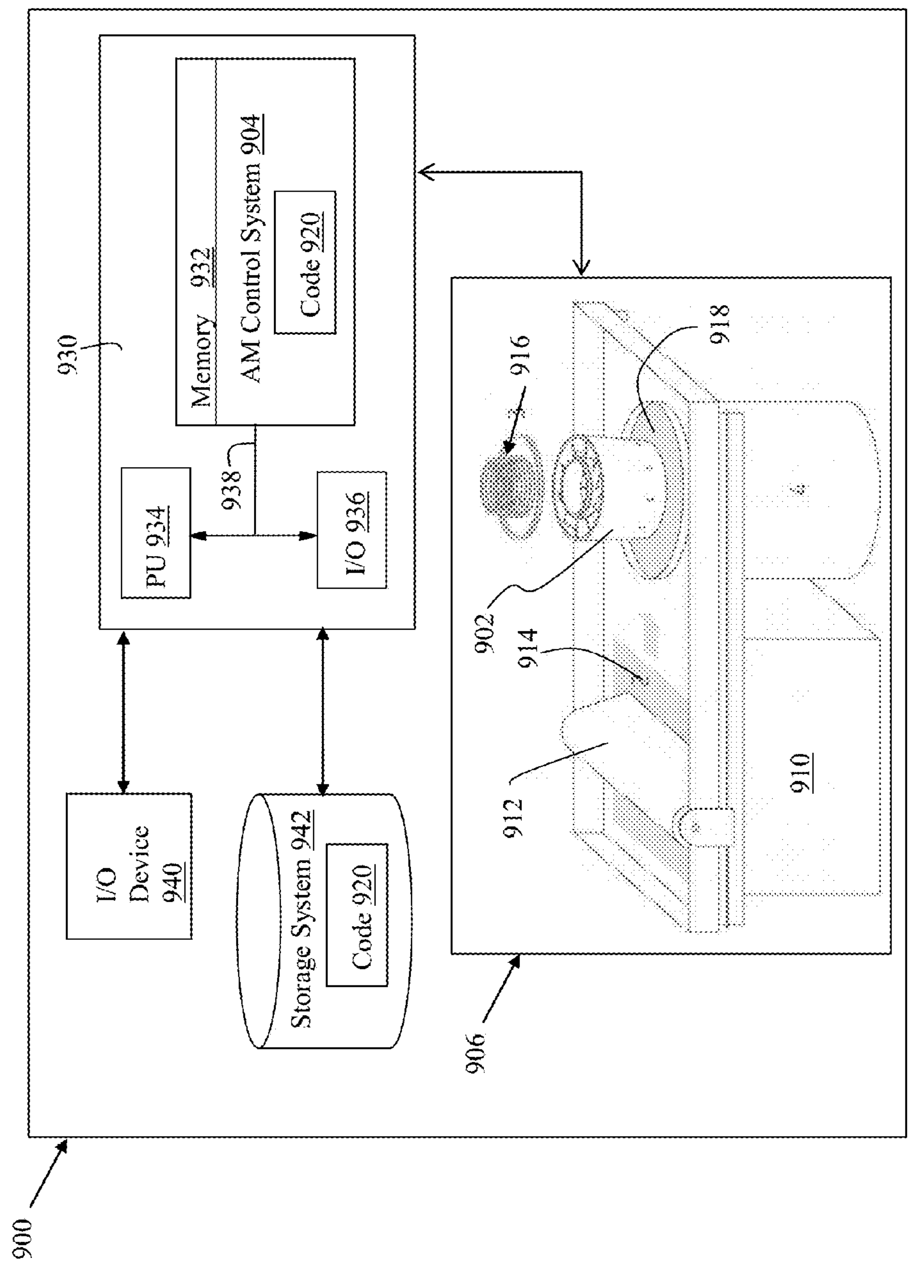
FIG. 6 shows a block diagram of an additive manufacturing process including a non-transitory computer readable storage medium storing code representative of a template according to embodiments of the disclosure.

To illustrate an example of an additive manufacturing process, FIG. 6 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture turbomachine component 107, 207 (FIGS. 2-5). AM system 900 generally includes a computerized additive manufacturing (AM) control system 904 and an AM printer 906. AM system 900, as will be described, executes code 920 that includes a set of computer-executable instructions defining turbomachine component 107, 207 (FIGS. 2-5) to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, turbomachine component 107, 207 (FIGS. 2-5) may be made of plastic/polymers or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of turbomachine component 107, 207 (FIGS. 2-5), described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of turbomachine component 107, 207 (FIGS. 2-5). As noted, code 920 includes a set of computer-executable instructions defining outer electrode that can be used to physically generate the tip, upon execution of the code by system 900. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing turbomachine component 107, 207 (FIGS. 2-5) into a series of thin slices that it assembles using AM printer 906 in successive layers of liquid, powder, sheet or other material. In the DMLM example, each layer is melted to the exact geometry defined by code 920 and fused to the preceding layer. Subsequently, the turbomachine component 107, 207 (FIGS. 2-5) may be exposed to any variety of finishing processes, e.g., minor machining, sealing, polishing, assembly to other part of the igniter tip, etc.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbomachine component comprising:

a body defining an inner cavity configured to receive a supply of a heat transfer fluid, the body having an outer surface and an inner surface opposing the outer surface, the inner surface facing the inner cavity;

a mount coupled with the inner surface of the body, the mount including:

an impingement baffle coupled with and separated from the inner surface of the body, the impingement baffle including a set of apertures configured to permit flow of the heat transfer fluid therethrough to contact the inner surface of the body; and a reclamation channel connected with the impingement baffle for reclaiming the heat transfer fluid; and a set of connectors extending between the inner surface and the mount, wherein the mount and the inner surface define a heat transfer region therebetween, the connectors are spaced from each other along a primary axis of the body, and the set of apertures, the reclamation channel, and the spaced connectors define a closed-loop path for the heat transfer fluid from the inner cavity through the set of apertures into the heat transfer region and back to the inner cavity.

2. The turbomachine component of claim 1, wherein the body defines a portion of an airfoil or a platform.

3. The turbomachine component of claim 1, wherein the body includes at least one film cooling hole extending therethrough.

4. The turbomachine component of claim 3, wherein the reclamation channel is adjacent the impingement baffle and fluidly coupled with the heat transfer region.

5. The turbomachine component of claim 1, wherein the set of apertures in the impingement baffle are sized to direct the heat transfer fluid toward the reclamation channel.

6. The turbomachine component of claim 1, wherein the mount further includes a support spine connecting the impingement baffle and the reclamation channel.

7. The turbomachine component of claim 1, wherein the reclamation channel extends a greater length along the primary axis than the impingement baffle.

8. The turbomachine component of claim 1, wherein the set of apertures includes at least two apertures having distinct primary axes with respect to one another as measured relative to the inner surface.

9. The turbomachine component of claim 1, further comprising:

a the barrier coating (TBC) along the outer surface of the body; and a bondcoat layer along the outer surface of the body between the TBC and the outer surface.

10. A turbomachine comprising:

a compressor section;

a combustor section coupled with the compressor section; and a turbine section coupled with the combustor section, the turbine section including at least one turbomachine according to claim 1.

11. The turbomachine of claim 10, wherein the body defines a portion of an airfoil or a platform.

12. The turbomachine of claim 10, wherein the reclamation channel is adjacent the impingement baffle and fluidly coupled with the heat transfer region and wherein the body includes at least one film cooling hole extending therethrough.

13. The turbomachine of claim 10, wherein the set of apertures in the impingement baffle are sized to direct the heat transfer fluid toward the reclamation channel.

14. The turbomachine of claim 10, wherein the mount further includes a support spine connecting the impingement baffle and the reclamation channel.

15. The turbomachine of claim 10, wherein the reclamation channel extends a greater length along the primary axis than the impingement baffle.

16. The turbomachine of claim 10, wherein the set of apertures includes at least two apertures having distinct primary axes with respect to one another as measured relative to the inner surface.

17. The turbomachine of claim 10, further comprising:

a thermal barrier coating (TBC) along the outer surface of the body; and a bondcoat layer along the outer surface of the body between the TBC and the outer surface.

* * * * *